United States Patent [19]

Kinashi et al.

[11] Patent Number: 5,204,858
[45] Date of Patent: Apr. 20, 1993

[54] ADDRESS SETTING AND FILTERING SYSTEM FOR TERMINAL ACCOMMODATING CIRCUITS IN A PACKET SWITCHING SYSTEM

[75] Inventors: Haruhiko Kinashi; Isao Hisada; Kiyo Takahashi, all of Tokyo, Japan

[73] Assignee: NEC Corporation, Tokyo, Japan

[21] Appl. No.: 571,371

[22] Filed: Aug. 23, 1990

[30] Foreign Application Priority Data

Aug. 23, 1989 [JP] Japan ................................. 1-217920
Mar. 30, 1990 [JP] Japan ..................................... 2-84182

[51] Int. Cl.⁵ ........................................... H04L 12/56
[52] U.S. Cl. ..................................... 370/94.1; 370/60; 370/61
[58] Field of Search ................... 370/54, 60, 60.1, 61, 370/67, 85.1, 94.1; 340/825.52

[56] References Cited
U.S. PATENT DOCUMENTS 4,769,812  9/1988  Shimizu ................................. 370/67
4,937,817  6/1990  Lin ....................................... 370/60
5,038,345  8/1991  Roth ..................................... 370/60

Primary Examiner—Douglas W. Olms
Assistant Examiner—Alpus H. Hsu
Attorney, Agent, or Firm—Sughrue, Mion, Zinn, Macpeak & Seas

[57] ABSTRACT

An address setting and filtering system for terminal accommodating circuits in packet switching systems for detecting and registering the address set by a terminal unit. The address system also prevents double registration of addresses. In one form of the invention, a source address detecting circuit detects and outputs an orginating source address from a source packet frame which is stored in a terminal address memory as a terminal source address. An address filter extracts a destination address from a packet frame received. If the destination address and the terminal address are the same, the received packet frame is transferred to the terminal unit.

4 Claims, 7 Drawing Sheets

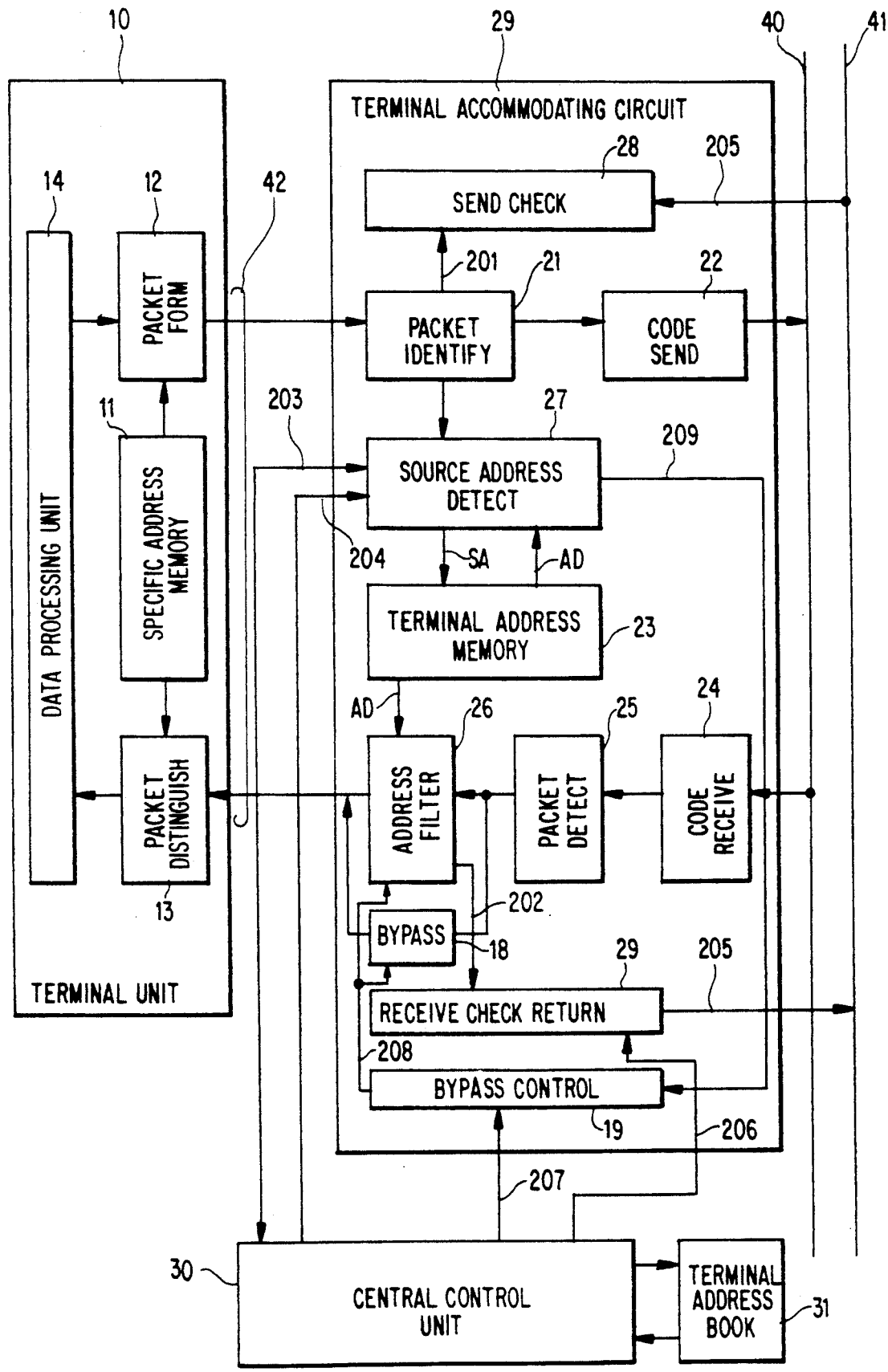

ADDRESS SETTING AND FILTERING SYSTEM FOR TERMINAL ACCOMMODATING CIRCUITS IN A PACKET SWITCHING SYSTEM

BACKGROUND OF THE INVENTION

1. Field of the Invention

The present invention relates to an address setting and filtering system for terminal accommodating circuits to be connected between data terminals for sending and receiving packet information on a high speed packet transmission bus.

2. Description of the Prior Art

In recent years, packet switching systems have come to be extensively used, and the development of communication networks in local area networks has made significant progress. Governmental bodies, communication companies and manufacturers in many countries of the world have announced plans for and started the implementation of the systematization of integrated service networks.

Where terminal units are to be accommodated into a high speed digital transmission bus (hereinafter referred to as simply "high speed bus"), since the coded information handled by the terminals themselves is low in transmission speed, the point of connection to the high speed bus should be equipped with a high speed interface, about 10 times as fast or even faster.

Thus, according to a known technique, each terminal unit is connected to a terminal accommodating circuit of the packet switching system via a low speed terminal transmission path, and this terminal accommodating circuit has an interface with the high speed transmission bus of the packet switching system to send and receive packets.

Therefore, each terminal accommodating circuit requires the registration of its specific terminal addresses, so that packet frames which should arrive at the terminal units accommodated in the circuit can be taken out of the high speed transmission bus.

Meanwhile, according to the transmission procedure of the packet switching system conforming to the CCITT Recommendation and the IEEE Standards, it is necessary to insert the address of the originating source into the source packet frame and to check the identity of the destination address in the received packet frame. The terminal unit also requires the registration of the terminal address assigned to it in a specific address memory. Accordingly, in an address setting system of this kind in the prior art, a terminal address is set and registered for each individual terminal unit, and the same terminal address is registered in the corresponding terminal accommodating circuit.

FIG. 1 is a functional block diagram illustrating one example of the prior art. In FIG. 1, terminal units 10 are accommodated into terminal accommodating circuits 90, which are connected to a high speed transmission bus 40.

Each of the plural terminal units 10 has a specific address memory 11, a packet forming section 12, a packet distinguishing section 13 and a data processing unit 14. Each of the plural terminal accommodating circuits 90 has a packet identifying section 91, a high speed code sending section 22, a terminal address memory 23, a high speed code receiving section 24, a packet detecting section 25 and an address filter 96. Meanwhile, the central control unit 30 of the packet switching system takes out a terminal address from a terminal address book 39, in which the map of terminal addresses is stored, and registers it in each of the terminal accommodating circuits 90. A packet sent and received in this packet switching system, as illustrated in FIG. 2, comprises, for instance, a packet start flag FLS, a destination address DA, a source address SA, data length information LEN, packet data DATA, error detection information FCS and a packet end flag FLE.

The specific address memory 11 of the terminal unit 10 stores the terminal address assigned to this terminal in the communication network. The packet forming section 12, when forming a source packet frame (FIG. 2), inserts the address taken out of the memory 11 into the packet frame the source address SA. Meanwhile, the packet distinguishing section 13, upon receiving the packet frame from the circuit 90 via a low speed transmission bus 15, extracts the destination address DA and, after checking the identity between this destination address DA and the terminal address taken out of the memory 11, takes the packet information into the data processing unit 14 within the terminal unit 10.

On the other hand, the packet identifying section 91 of the circuit 90 identifies the packet frame received from the terminal unit 10, and transfers it to the high speed code sensing section 22 to have it sent to the high speed bus 40. In the terminal address memory 23 the terminal address is already registered and recorded into the address book 39 by the central control unit 30, corresponding to the terminal unit to be accommodated. The high speed code receiving section 24 receives a high speed code from the high speed bus 40, and the packet detecting section 25 detects, the packet frame and supplies it to the address filter 96. The filter 96 takes out the destination address DA from the received packet frame and the terminal address from the terminal address memory 23, compares them and, if they are found identical, transfers this packet to the packet distinguishing section 13 of the terminal unit 10.

Therefore, a specific terminal address assigned to a given terminal unit 10 is set into both the specific address memory 11 of the unit 10 and the terminal address book 39, and should also be registered by the central control unit 30 into the memory 23 of the terminal accommodating circuit 90 which connects this terminal unit 10.

This address setting system in the prior art, so structured as to register the same terminal address in a terminal unit and a position in the terminal address book corresponding to the terminal accommodating circuit, involves the trouble of setting the same registration in two positions, and also entails the risk of wrong setting.

SUMMARY OF THE INVENTION

An object of the present invention, therefore, is to provide an address setting and filtering system for terminal accommodating circuits, for which the aforementioned problems are solved by providing each terminal accommodating circuit with means to detect the address set by a terminal unit and registering it into a terminal address memory and a terminal address book.

Another object of the invention is to provide an address setting and filtering system for terminal accommodating circuits, which facilitates address setting at the start-up time of the system or alters the terminal addresses by installing means for bypassing the address filters of terminal accommodating circuits and thereby sending out the whole packet information on the high speed transmission bus to terminal units.

Still another object of the invention is to provide an address setting and filtering system for terminal accommodating circuits, which upon receiving an incoming packet frame, can also prevent double registration of addresses by sending, a reception confirmation signal to the originating source and detecting double registration of the address, if any, in the terminal address book.

According to the present invention, in order to accomplish its objects stated above, there is provided an address setting and filtering system for terminal accommodating circuits in a packet switching system, in which terminal addresses are set in terminal accommodating circuits, each accommodating a terminal unit in which prescribed packet switching is performed, connecting the terminal unit to a high speed transmission bus and transferring packet frames.

Each of said terminal accommodating circuit comprises:

source address detecting means for detecting an originating source address from a source packet frame received from said terminal unit and outputting this address;

a terminal address memory for storing the output of the source address detecting means as a terminal address; and address filter means for taking out a destination address from the packet frame received from said high speed transmission bus and, if this address is found to be identical to the terminal address stored in the terminal address memory, transferring said received packet frame to said terminal unit.

BRIEF DESCRIPTION OF THE DRAWINGS

The above stated objects and features of the present invention will become more apparent from the following detailed description when taken in conjunction with the accompanying drawings, in which:

FIG. 3 is a block diagram illustrating a preferred embodiment of the present invention;

In these drawings, the same reference numerals denote respectively the same structural elements.

DETAILED DESCRIPTION OF THE PREFERRED EMBODIMENT

Figure 1:
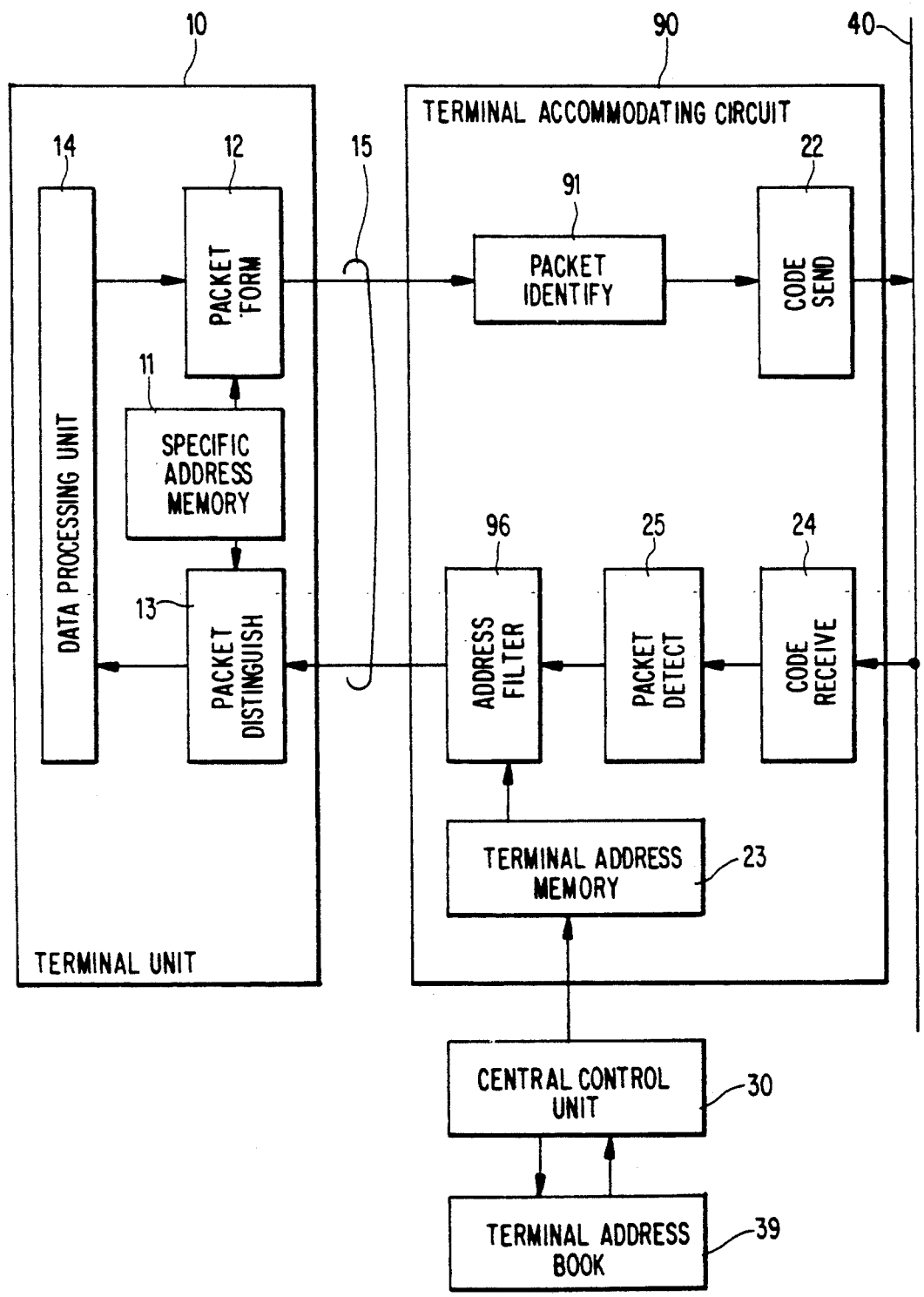
FIG. 1 illustrates the configuration of a packet switching system according to the prior art.
Figure 2:
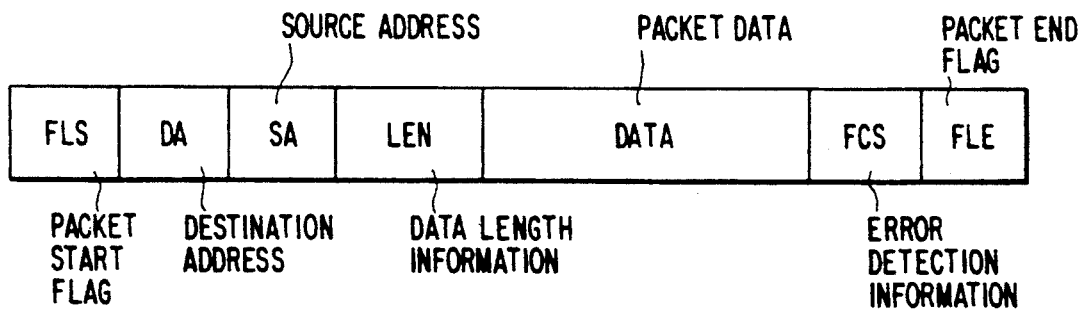
FIG. 2 is a diagram showing an example of packet frame format.

FIG. 3 illustrates a preferred embodiment of the present invention. In this figure, the same constituent elements as in the prior art configuration are assigned respectively the same reference codes. The preferred embodiment of the invention consists of the high speed bus 40, a check signal bus 41, a plurality of terminal accommodating circuits 20, a plurality of terminal units 10, the central control unit 30, and a terminal address book 31.

Each terminal unit 10 is connected to the bus 40 via the corresponding circuit 20. As in the prior art configuration, the terminal unit 10 is provided with the specific address memory 11, the packet forming section 12, the packet distinguishing section 13, and the data processing unit 14 for processing packet data. The central control unit 30 is connected to each of the circuits 20 to control them and provided with the terminal address book 31.

Each of the plural terminal accommodating circuits 20 has a packet identifying section 21, the high speed code sending section 22, the terminal address memory 23, the high speed code receiving section 24, the packet detecting section 25, address filter means 26, a source address detecting section 27, a send checking section 28, a receive check returning section 29, a bypass control section 19 and a bypassing section 18. Sections 28 and 29 are connected to the check signal bus 41.

The packet identifying section 21 identifies the packet frame received from the terminal unit 10 by a digital code received from the packet forming section 12, transfers it to the sending section 22 and to the detecting section 27, and notifies the send checking section 28 when the packet has been sent (a signal 201).

The terminal address memory 23 registers as the terminal address the source address SA detected by the detecting section 27 from the source packet, instead of the address set from the address book 39 by the control unit 30.

The address filter means 26 checks the identity between the address stored in the memory 23 and the destination address DA of the received packet frame, transfers the received packet frame to the packet distinguishing section 13 of the terminal unit 10 and, at the same time, notifies the receive check returning section 29 of this transfer (a signal 202). There further is provided a function to have the bypassing section 18 bypass all the received packet frames, as required by, the address filter means 26 when they are transferred to the terminal unit 10 (details will be given below).

When the identifying section 21 has identified a source packet frame from the terminal unit 10, the detecting section 27 detects the source address SA of this packet frame. Further, it searches for an address AD already stored in the memory 23 and, if no address identical to the detected address SA is found to be registered (in the case of initial setting, address change or the like), it stores the detected source address SA in the memory 23 and, at the same time, sends the address SA out to the central control unit 30 as a new terminal address (a signal 203).

On the other hand, if the identical address is found to be registered, the detecting section 27 sends the detected address SA to the control unit 30 only when it is in the initialization state. Incidentally, the detecting section 27 is initialized when it has received an initializing instruction (a signal 204) from the control unit 30. The section 27, when in the initialization state, notifies the bypass control section 19 of whether or not the source address SA has been detected from the source packet (by a signal 205).

The send checking section 28 begins time measurement upon receipt of the packet sending notification signal 201 from the packet identifying section 21 and, if the receive check signal 205 is received from the check signal bus 41 before the prescribed time limit is reached, judges normal packet sending and reception have been achieved. Or if the prescribed time limit is reached without this receive check signal 205 being received, the checking section 28 instructs the terminal unit 10 to send the packet frame again.

The receive check returning section 29, upon receipt of the notification signal 202 for the transfer of the receive packet frame to the terminal unit 10 from the address filter means 26, sends the receive check signal 205 to the checking section 28 of the terminal accommodating circuit 20 of the source via the check signal bus 41.

If the identical address is stored in duplication in the terminal address memories 23 of a plurality of circuits 20, the packet having this address as its destination address DA is simultaneously received by a plurality of circuits 20 and, in response to this reception, the receive check signal 205 is simultaneously sent to the check signal bus 41, resulting in the destruction of the receive check signal 205. In order to prevent this destruction, the control unit 30 compares the address registered in the address book 31 corresponding to the particular terminal and the address (the signal 203) received from the detecting section 27 of each terminal accommodating circuit 20 and, if any duplicate registrations are detected, instructs (a signal 206) the receive check returning section 29 of the circuit 20 in which any earlier address registration took place, to stop returning the receive check signal 205, while placing in an active state only the receive check returning section 29 of the circuit 20 in which the latest address registration took place.

The bypass control section 19 is actuated when the system is started up or any terminal unit is additionally installed and/or undergoes an address change. On such an occasion, the central control unit 30 simultaneously gives an initializing instruction 204 and a bypassing instruction (a signal 207) to the bypass control section 19, which, in response to this instruction, gives a switching instruction (a signal 208) to the address filter means 26.

Figure 4:
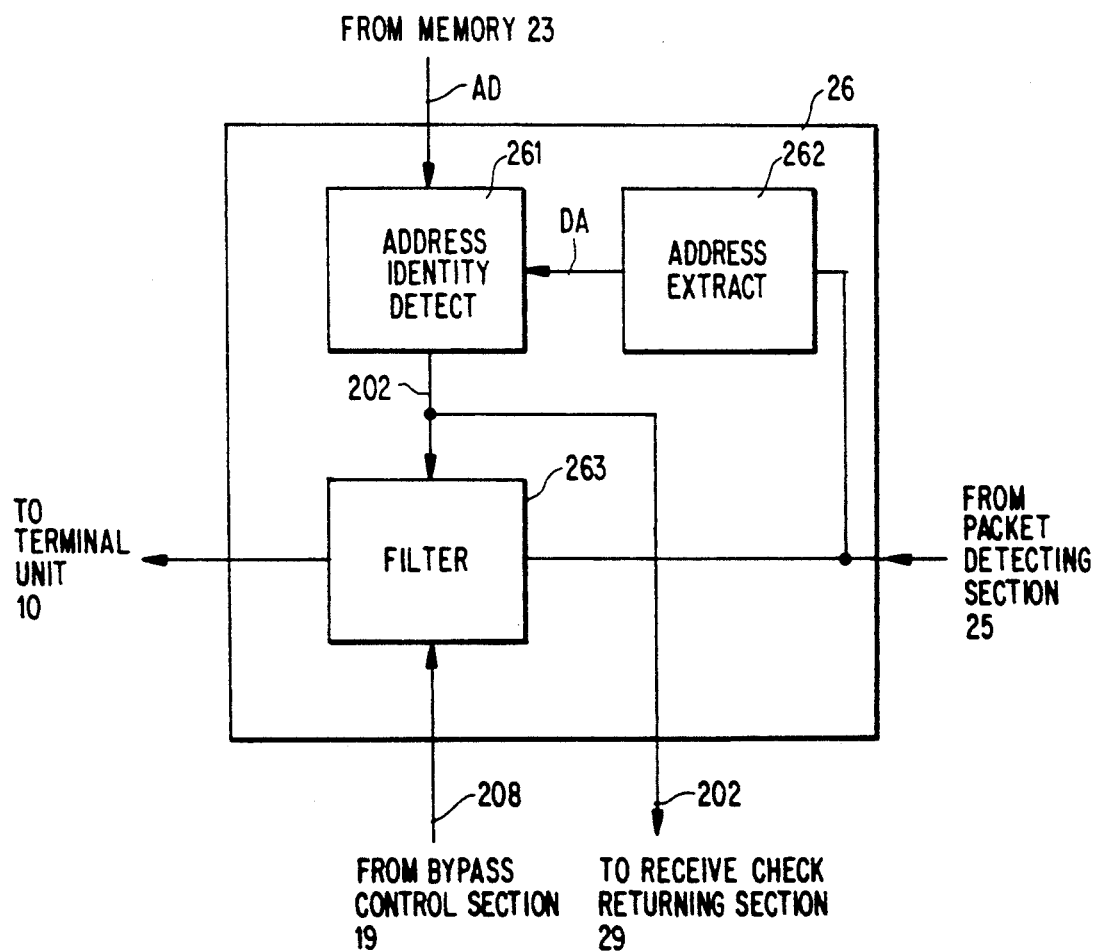
FIG. 4 is a block diagram illustrating more details of a part of FIG. 3.

Now, the filter means 26 will be described with reference to FIG. 4. This address filter means 26 consists of an address identity detecting section 261, a destination address extracting section 262 and a filter 263.

The extracting section 262 extracts the destination address DA out of the packet frame sent from the packet detecting section 25. The detecting section 261 compares this extracted destination address DA and an address AD in the terminal address memory 23 and, if they are found identical, so performs control as to let the filter 263 pass the received packet while, at the same time, notifying the receive check returning section 29 of the arrival of the packet at the terminal unit 10 (the signal 202).

Figure 5:
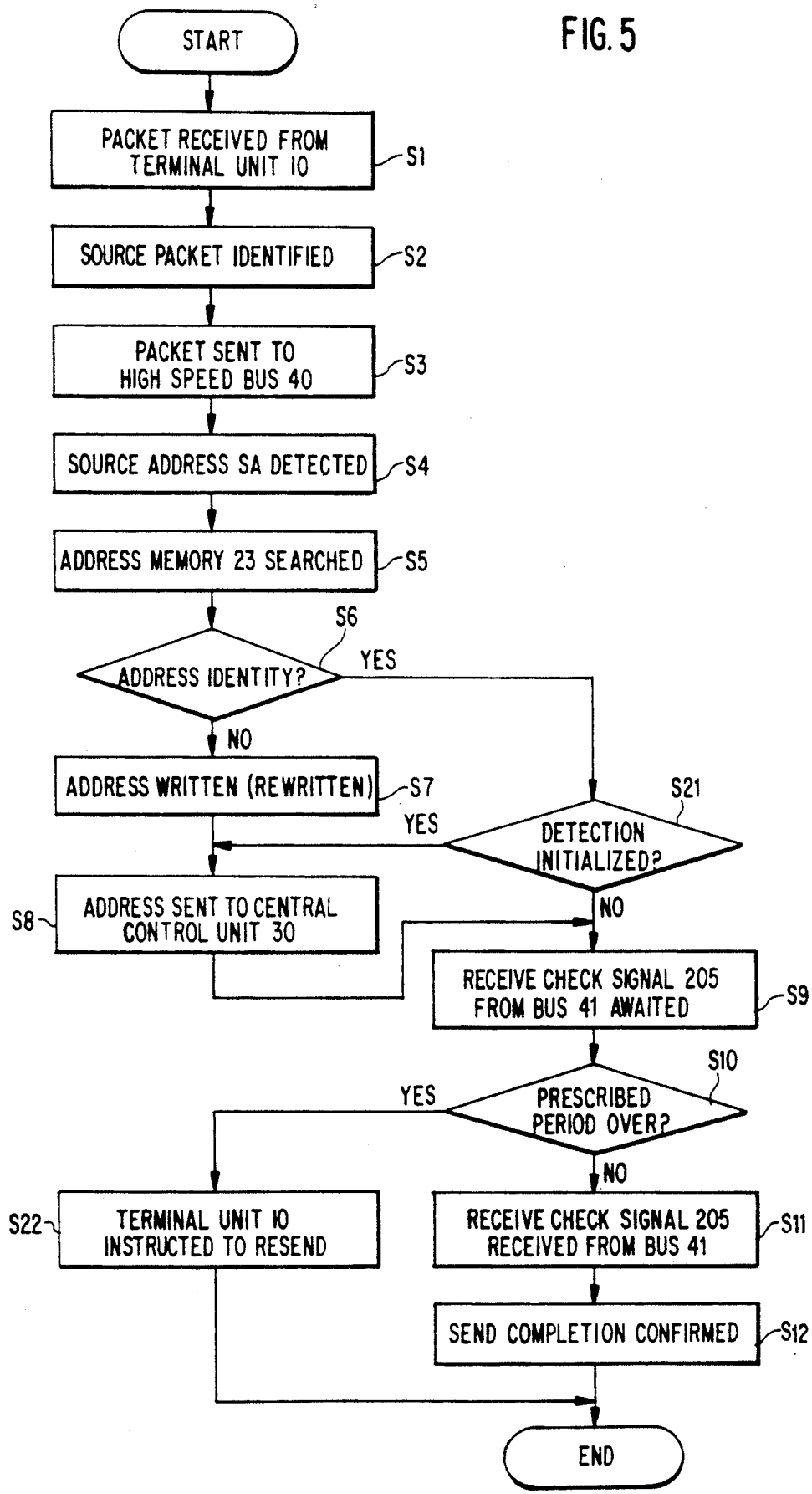
FIGS. 5 to 8 are flow charts showing the operation of the preferred embodiment.

Next, the operations of this preferred embodiment will be described with reference to FIGS. 5 to 8, beginning with the general packet sending operation with reference to FIG. 5. The packet identifying section 21 of the circuit 20, having received a source packet frame in digital codes from the terminal unit 10 (Step S1), identifies the packet frame from the sequence of the digital codes (Step S2). The identified packet frame is supplied to the sending section 22 and sent out on the high speed bus 40 (Step S3). On the other hand, the source address detecting section 27 detects the source address SA from the transmitted packet frame (Step S4), and judges this address to be the terminal address of the terminal unit 10 to which this section 27 is connected. The section 27 searches the addresses already stored in the terminal address memory 23 (Step S5), and checks if any of them is identical to the detected source address SA (Step S6).

If the source address SA of the packet transmitted from the terminal unit 10 is not registered in the memory 23, i.e. no identity is detected at Step S6, the accommodated terminal 10 is deemed to have been replaced. At this time, the detecting section 27 writes the detected source address SA into the memory 23 (Step S7) using the same procedure as used in the initialized state, (rewrites the address existing therein) and sends the detected source address SA to the control unit 30 as the new terminal address AD of the terminal unit 10 (Step S8).

Meanwhile, the send checking section 28, which was notified of packet sending by the packet identifying section 21 when the packet frame was sent by the sending section 22 to the high speed bus 40 at Step S3, waits for the arrival of the receive check signal 205 from the check signal bus 41 (Step S9). Thus, the send checking section 28, having been notified of the sending of the source packet frame, starts counting the time and, if the receive check signal 205 is received (Step S11) from the arrival terminal via the bus 41 before the lapse of the prescribed length of time (Step S10), ends the series of procedures upon confirming the receipt of the sent packet frame at its destination (Step S12). If the prescribed time limit is reached without the receive check signal 205 being received at Step S10, the terminal unit 10 is given an instruction to send the packet again (Step S22).

If address identity is detected at Step S6, the source address detecting section 27, upon receiving an initializing instruction from the control unit 30 (Step S21), will proceed to Step S8. The section 27, having sent the address at Step S8, may release its initialization for itself. If no initializing instruction (204) is given at Step S21, i.e. packet frames are consecutively transmitted from the terminal unit 10, the section 27 proceeds from Step S21 to Step S9 without sending the terminal address to the control unit 30.

Figure 6:
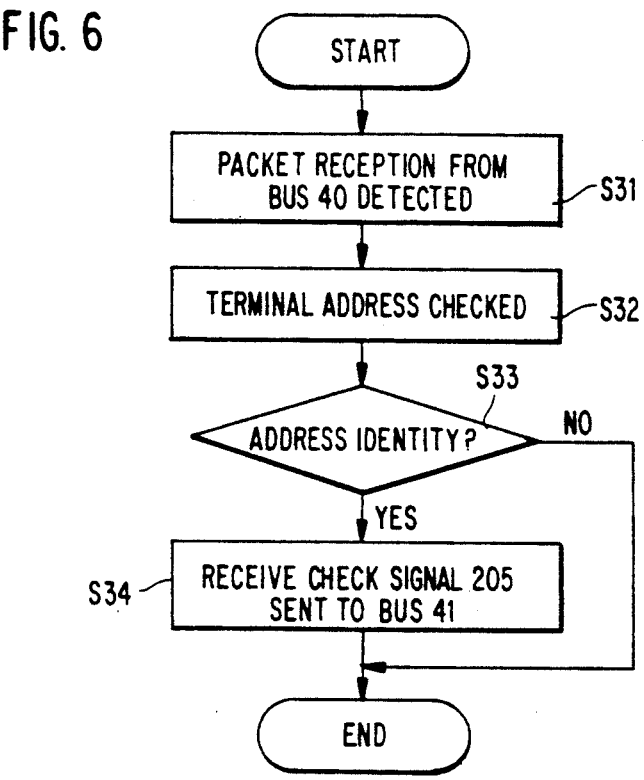

Next, the packet receiving operation will be described with reference to FIG. 6. When the packet detecting section 25 has detected the reception of a packet frame from the high speed bus 40 via the code receiving section 24 (Step S31), the address filter means 26 takes the destination address DA out of the received packet frame and checks its identity with the address AD stored in the terminal address memory 23 (Step S32). Thus, the address identity detecting section 261 compares the address DA extracted by the destination address extracting section 262 and the address AD in the memory 23 and, if they are found identical (Step S33), gives an identity output 202. When this signal 202 is entered into the filter 263, the received packet frame passes the filter 263 and is sent to the packet distinguishing section 13 of the terminal unit 10. The identity output 202 at this time is also entered as the packet transfer notification into the receive check returning section 29, which, upon receipt of this notification, sends the receive check signal 205 to the check signal bus 41 (Step S34). As a result, this receive check signal is received at Step S11 of the terminal accommodating circuit 20 on the packet sending side. At this time, the packet frame does not pass the bypassing section 18 because it is not actuated.

Figure 7:
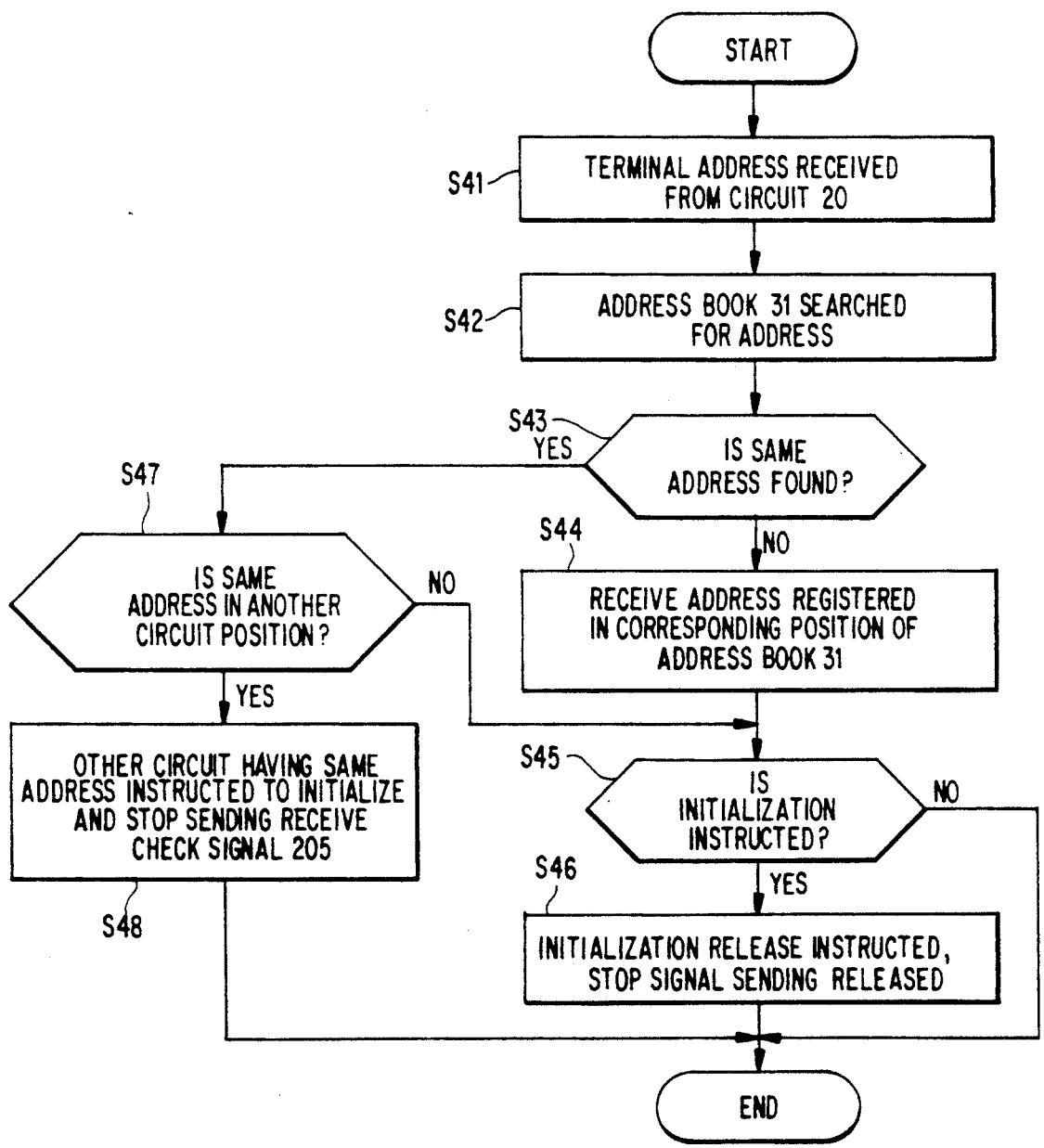

Now the operating procedure of the control unit 30 will be described with reference to FIG. 7. The unit 30, having received the terminal address AD from the source address detecting section 27 of the circuit 20 (Step S41), searches the address book 31 for the same address as the terminal address that has been received (Step S42). The absence of the same address therein (Step S43) means that the terminal unit 10 has been newly accommodated. Therefore, the control unit 30 newly registers the received terminal address AD (Step S44) in a storage position of the address book 31 corresponding to the circuit 20 which has transmitted the terminal address. The control unit 30 gives at this time an inliatizing instruction to the circuit 20 from which the address has been sent (Step S45) and ends the series of processing by cancelling the initializing instruction and the instruction to stop sending the receive check signal (Step S46).

If the same address is found at Step S43, the control unit 30 will check if this same address is also found elsewhere other than the position corresponding to the terminal accommodating circuit 20 which has newly sent the address (Step S47). The presence of the same address elsewhere means that the terminal unit 10 has been shifted to another position. Then, the control unit 30 ends the series of processing by giving the initializing instruction 203 to the source address detecting section 27 of the circuit 20 in that other position having this same address (i.e. the circuit 20 in which the pertinent terminal was previously accommodated) and at the same timing giving an instruction to stop returning to the receive check returning section 29 (Step S48).

If, at Step S47, the same address is stored in the same position, instead of another position, i.e. if the terminal address has been accepted again, the control unit 30 will proceed to Step S45.

Figure 8:
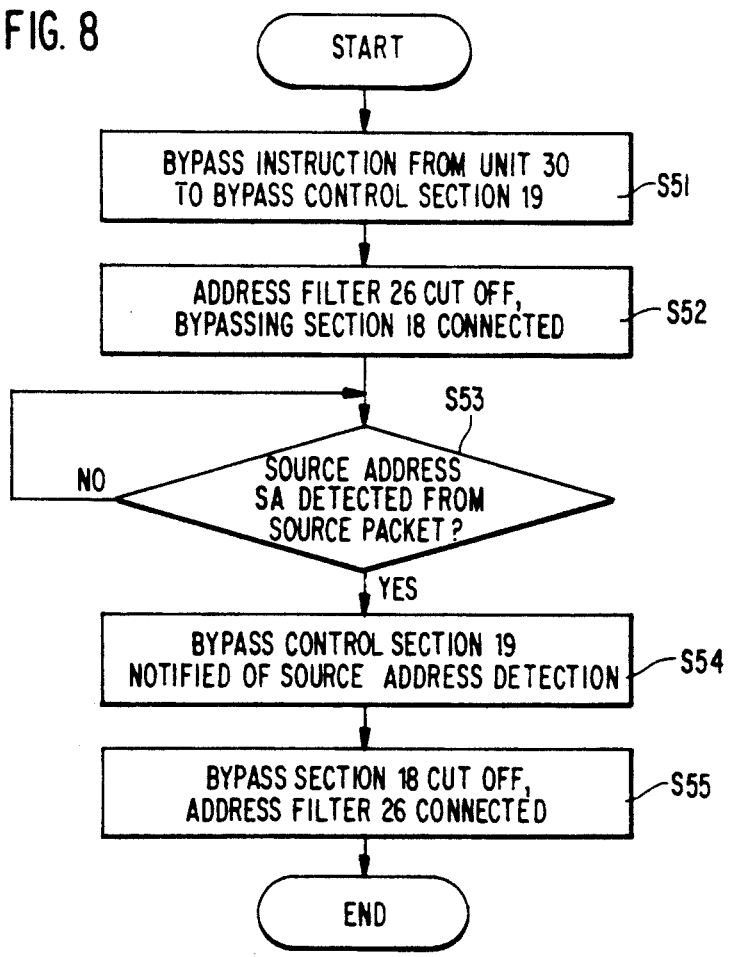

Here let us consider the case in which an initializing instruction has been given to the detecting section 27 of the circuit 20. At the time of starting up the system or changing the terminal unit address, for instance, when no packet information has been sent from any data terminal connected to the circuit 20, the detecting section 27 cannot yet detect any source address, and the initial value (or an old address) is set in the address memory 23. Therefore, even if packet information destined for a terminal unit connected to this circuit 20 arrives from the high speed bus 40, this packet information cannot be accepted because there is no identity to be detected by the address identity detecting section 261. On such an occasion, therefore, the operation shown in FIG. 8 is performed. Thus, the control unit 30 also sends the bypassing instruction 207 to the terminal accommodating circuit 20 to which it has sent the initializing instruction 204 (Step S51). Having received this instruction 207, the bypass control section 19 supplies the switching instruction 208, which stops the filter 263 and makes it impossible for the packet to pass the filter 263 in spite of the identity output 202 from the detecting section 261. On the other hand, the bypassing section 18, which has been separated, is connected in response to the switching signal 208 (Step S52). In this state, all packet information on the high speed bus 40 is sent to the terminal unit 10 via the code receiving section 24, the packet detecting section 25 and the bypassing section 18. At this time, the filtering of received packet information is achieved only by the packet distinguishing section 13 of the terminal unit 10. This makes it possible for packet information destined for the terminal unit 10 to be sent out to a low speed transmission bus 42 even when no source address SA has been detected as yet in the terminal accommodating circuit 20 (or when it is at the initial value).

Now, if even one unit of packet information is sent out from the terminal unit 10 to the high speed bus 40 via the circuit 20, the source address detecting section 27 will detect the source address SA (Step S53). The detected source address SA detected then is sent to the control unit 30 as stated with reference to Step S8 of FIG. 5. The detecting section 27 also notifies (the signal 209) the bypass control section 19 of the address detection (Step S54). Having received this notification, the bypass control section 19 cuts off the bypassing section 18, and reconnects the filter 263 (Step S55). This is followed by a return to the regular address detecting and filtering operations already described.

Figure 9:
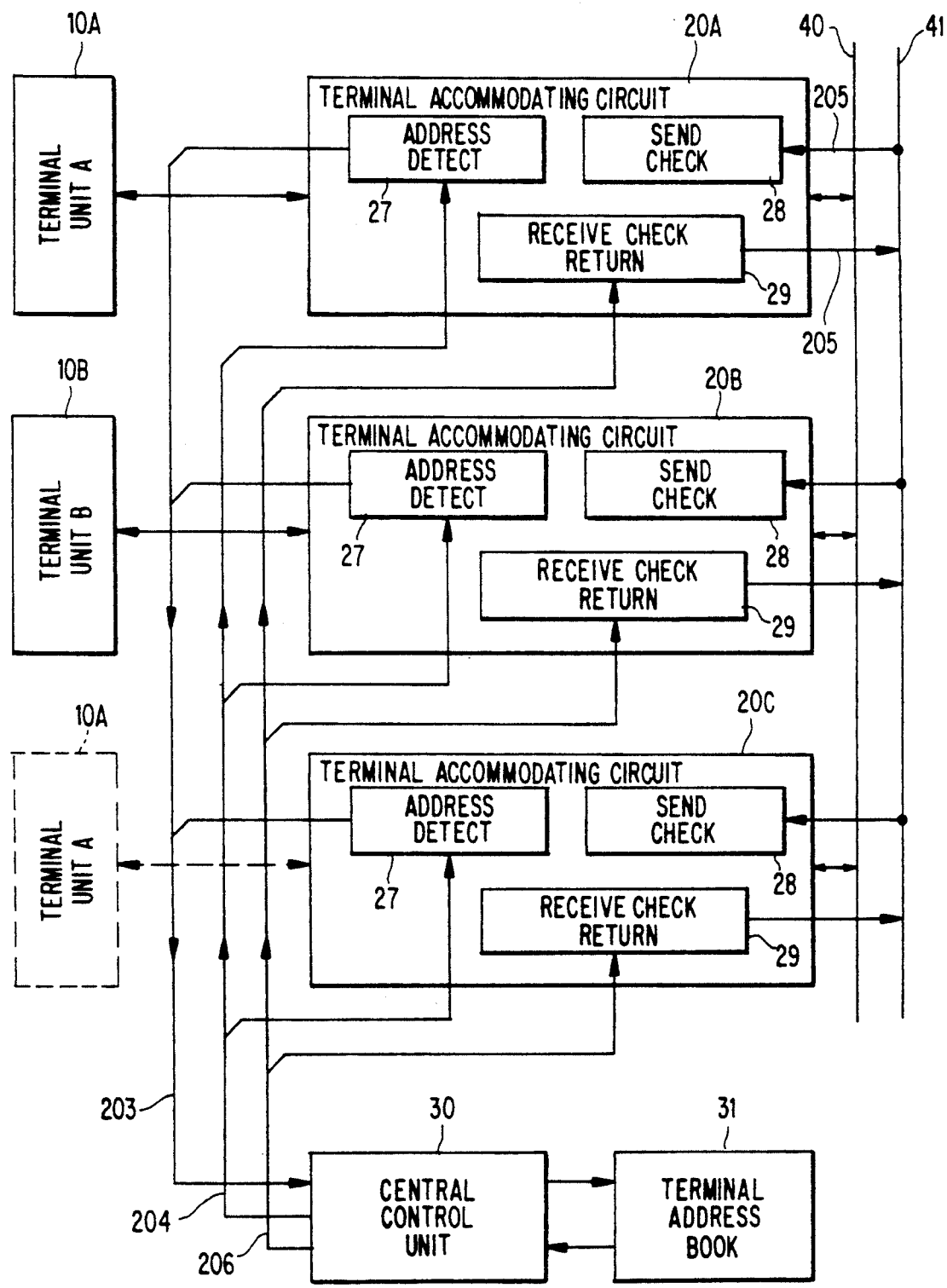
FIG. 9 is a block diagram illustrating an example in which the invention is used.

On the basis of the foregoing description, the operations which take place when terminal units are reconnected will be summarized below by way of an example. In FIG. 9, a terminal unit 10A is connected to a terminal accommodating circuit 20A, and a terminal unit 10B, to a terminal accommodating circuit 20B. In the terminal accommodating circuits 20A and 20B, terminal addresses "A" and "B" assigned to the terminal units 10A and 10B are detected by their respective source address detecting sections 27 and stored in the respective terminal address memories 23.

If, in this arrangement, the terminal 10A is shifted to another circuit 20C, the terminal address "A", transmitted from the terminal unit 10A, will be registered in the circuit 20C as described above. Then, in the circuit 20A, the detecting section 27 receives the initializing instruction from the control unit 30, and the receive check returning section 29 receives the return stop instruction. Therefore, the packet frame containing the destination address "A", which is transmitted over the high speed bus 40, is received by the circuits 20A and 20C, but the receive check signal is transmitted only from the circuit 20C. If, on this occasion, the terminal unit 10A, to which the terminal address "A" is set, accidentally remains connected to the circuit 20A, the arriving packet frame can be received by both of the doubly set terminal units 10A. Since the two same addresses remain registered in the address book 31 at this time, the control unit 30 can detect it by using another program.

What is claimed is:

1. An address setting and filtering system for terminal accommodating circuits in a packet switching system in which terminal addresses are set in said terminal accommodating circuits, each of said terminal accommodating circuits accommodating a terminal unit to which prescribed packet switching is performed, connecting the terminal unit to a high speed transmission bus and transferring packet frames, wherein each of said terminal accommodating circuits comprises:

source address detecting means for detecting and outputting an originating source address from a source packet frame received from said terminal unit;

a terminal address memory for storing said source address from the output of the source address detecting means as a terminal source address; and address filter means for extracting a destination address from a packet frame received from said high speed transmission bus and, if said destination address is found to be identical with the terminal address stored in said terminal address memory, transferring said packet frame to said terminal unit.

2. An address setting and filtering system for terminal accommodating circuits in a packet switching system, as claimed in claim 1, wherein each of said terminal accommodating circuits further comprises bypassing means for bypassing said address filter means and transferring all packet information received from said high speed transmission bus to said terminal unit, irrespective of the contents of said terminal address memory.

3. An address setting and filtering system for terminal accommodating circuits in a packet switching system, as claimed in claim 2, wherein each of said terminal accommodating circuits further comprises control means for cutting off said bypassing means and subjecting all received packet information again to address filtering by said address filter means whenever said source address detecting means detects said originating source address contained in said source packet frame and received from said terminal unit during the operation of said bypassing means.

4. An address setting and filtering system for terminal accommodating circuits in a packet switching system, as claimed in claim 1, further comprising a check signal bus for transmitting check signals; a central control unit; and a terminal address book connected to the central control unit, wherein:

the source address detecting means of said terminal accommodating circuit detects the source address from said source packet frame received from said terminal unit, causes it to be stored in said terminal source address memory and, at the same time, supplies a new terminal source address which is detected in an initialized state;

said terminal accommodating circuit is additionally equipped with:

a send checking section for confirming the completion of the sending of said packet frame from the terminal unit when a receive check signal has been received via said check signal bus within a prescribed period from the time said source packet frame is sent to said high speed transmission bus, and a received check returning section for sending the receive check signal, indicating confirmation of packet frame reception, to the terminal accommodating circuit which sends said packet frame via said check signal bus when the destination address of the packet frame received from said high speed transmission bus and the terminal source address stored in the terminal address memory are found identical, except when a return stop instruction is being received;

said terminal address book stores a terminal source address outputted from said source address detecting means for each of the terminal accommodating circuits; and said central control unit, upon receiving the terminal source address outputted from said source address detecting means, searches the terminal address book, and when the received terminal source address has been already stored in the terminal address book, the central control unit sends an instruction to stop returning the receive check signal and an initializing instruction to a terminal accommodating circuit corresponding to the terminal source address which had been already stored in the terminal address book.

* * * * *

UNITED STATES PATENT AND TRADEMARK OFFICE
CERTIFICATE OF CORRECTION

PATENT NO. : 5,204,858

DATED : April 20, 1993

INVENTOR(S) : Haruhiko KINASHI et al.

It is certified that error appears in the above-identified patent and that said Letters Patent is hereby corrected as shown below:

Col. 7, line 9, delete "inliatizing" and insert -- initializing--.

Signed and Sealed this

Twenty-second Day of February, 1994

Attest:

BRUCE LEHMAN

Attesting Officer     Commissioner of Patents and Trademarks